Nov. 15, 1938.      D. L. DRISCOLL      2,136,418
DRIVE BUSHING
Filed Feb. 15, 1936      2 Sheets-Sheet 1
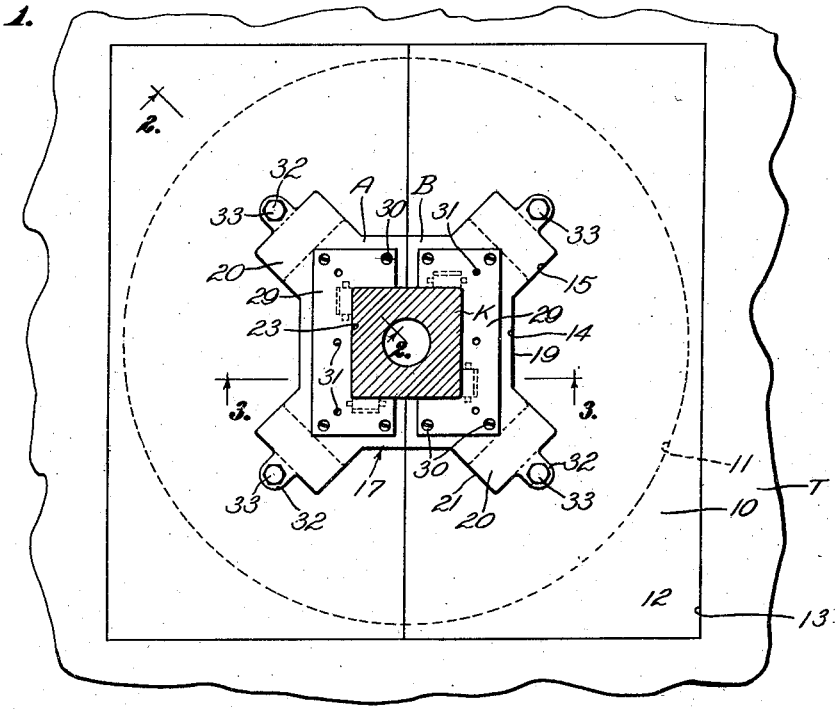
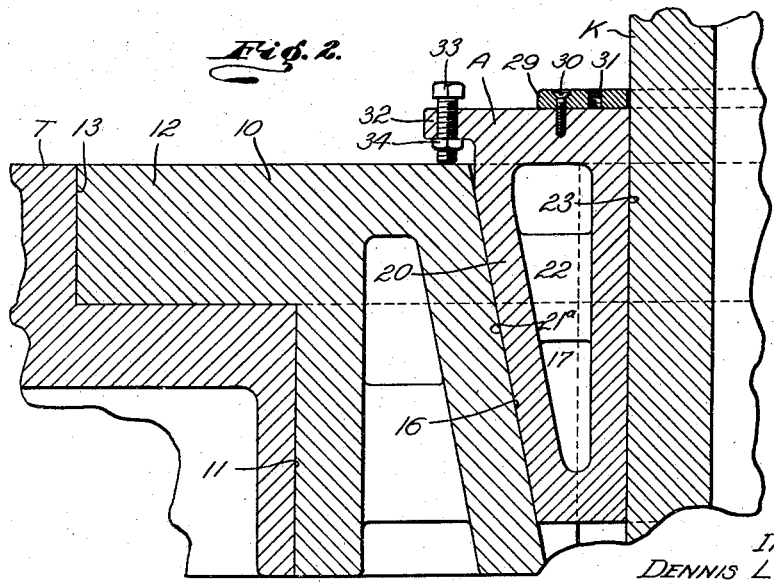
Inventor
DENNIS L. DRISCOLL
By
His Attorney Nov. 15, 1938.  D. L. DRISCOLL  2,136,418
DRIVE BUSHING
Filed Feb. 15, 1936  2 Sheets-Sheet 2
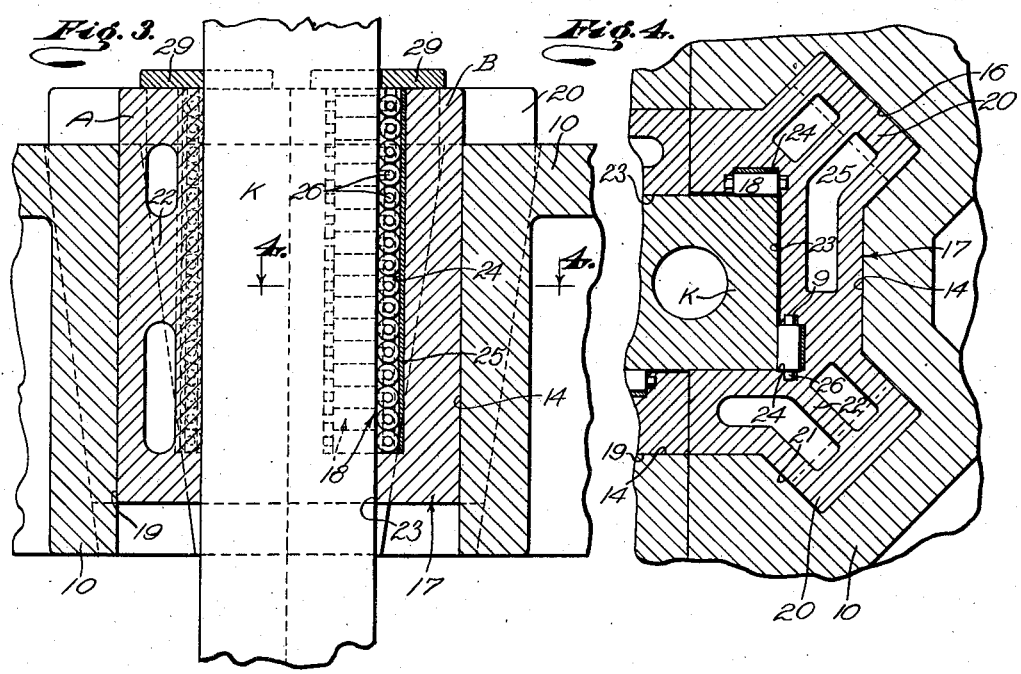
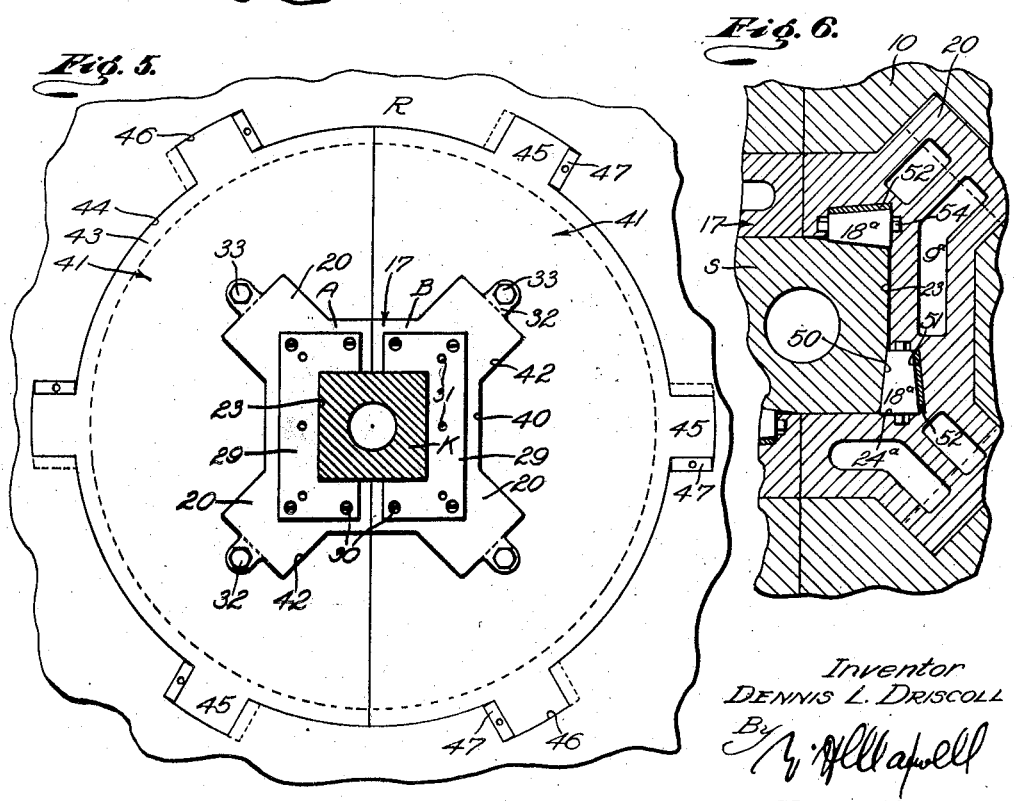
Inventor
DENNIS L. DRISCOLL
By
His Attorney Patented Nov. 15, 1938

2,136,418

UNITED STATES PATENT OFFICE 2,136,418

DRIVE BUSHING

Dennis L. Driscoll, Los Angeles, Calif., assignor to Lawrence F. Baash, Los Angeles, Calif.

Application February 15, 1936, Serial No. 64,082

8 Claims. (Cl. 255—23)

This invention relates to well drilling apparatus and relates more particularly to a drive bushing for a rotary table. A general object of this invention is to provide a simple, practical and improved drill stem bushing or kelly bushing for a rotary table.

In the rotary method of well drilling it has been the general practice to provide a master bushing in the rotary table having a tapered opening for receiving the slips which grip the drill pipe, etc. This tapered opening has usually been provided with a square recess in its upper end for receiving a square flange on the drive bushing or kelly bushing employed to rotate the drilling string. The square recess and the square flange of the typical drive bushing have provided only very limited surfaces for the transmission of the turning forces.

Another object of this invention is to provide a drive bushing or kelly bushing having extensive substantially vertical surfaces for the transmission of the driving forces or turning forces.

Another object of this invention is to provide a drive bushing or kelly bushing having a polygonal exterior for cooperating with the polygonal opening of a master bushing of the general character set forth and claimed in my Patent No. 2,075,028, granted March 30, 1937.

Another object of this invention is to provide a drive bushing or kelly bushing that is maintained in proper cooperation with the drill stem or kelly through engagement with the inclined walls of slots in the master bushing.

Another object of this invention is to provide a drive bushing or kelly bushing having lugs or wings cooperating with slots in the master bushing which wings present large surfaces for receiving the thrusts or turning forces from the master bushing and also prevent working or play of the kelly bushing in the master bushing.

Another object of this invention is to provide a kelly bushing of the character mentioned embodying series of rollers for cooperating with the kelly for transmitting the turning forces thereto, which rollers permit the vertical feeding or shifting of the kelly with a minimum of friction.

Another object of this invention is to provide a drive bushing or kelly bushing of the character mentioned in which the kelly engaging rollers bear on replaceable hardened shims or plates, thus relieving the kelly bushing of practically all friction and wear.

Another object of the invention is to provide a drive bushing of the character mentioned in which the majority of the kelly engaging rollers or parts are below the upper surface of the rotary table effecting a positive, dependable torque transmission.

Another object of this invention is to provide a kelly bushing of the character mentioned embodying tapered rollers or frusto-conical rollers for cooperating with a worn drill stem or kelly.

Another object of this invention is to provide a kelly bushing of the character mentioned that is simple and inexpensive to manufacture.

The various objects and features of my invention will be fully understood from the following detailed description of typical preferred forms and applications of my invention, throughout which description reference is made to the accompanying drawings, in which:

Fig. 1 is a top or plan view of one form of the invention showing it in operating position in a master bushing. Fig. 2 is an enlarged fragmentary vertical detailed sectional view taken substantially as indicated by line 2—2 on Fig. 1. Fig. 3 is an enlarged fragmentary vertical detailed sectional view taken substantially as indicated by line 3—3 on Fig. 1. Fig. 4 is a fragmentary horizontal detailed sectional view taken as indicated by line 4—4 on Fig. 3. Fig. 5 is a top or plan view showing the kelly bushing of the present invention arranged in another form of master bushing and Fig. 6 is a view similar to Fig. 4 showing another embodiment of the invention having a specific form of kelly engaging rollers.

The form of the invention illustrated in Figs. 1 to 4, inclusive, of the drawings, is intended for use in a master bushing 10. The bushing 10 comprises two equal complementary sections and is seated in the opening 11 of a rotary table T. A polygonal or square flange 12 at the upper end of the master bushing 10 cooperates with a correspondingly shaped recess 13 in the upper portion of the opening 11 whereby the bushing 10 is turned with the table T. The master bushing 10 has a central opening 14 for receiving the pipe gripping slips (not shown) and for receiving the kelly bushing of this invention. The opening 14 is polygonal or square in transverse cross section and is of uniform width or size throughout its length. This formation of the opening 14 is important as it provides the opening with flat vertical walls of large extent. In practice the flat walls of the opening 14 extend between the upper and lower ends of the master bushing 10. Vertically extending slots 15 are provided in the wall of the opening 14. In the case illustrated in the drawings there is a slot 15 in each corner of the polygonal opening 14. The slots 15 are of uniform width throughout their length having parallel vertical side walls. The bottom walls or inner walls 16 of the vertical slots 15 are flat and are inclined downwardly and inwardly. The inclination of the walls 16 is uniform, as illustrated in Fig. 2.

The improved kelly bushing of the present invention illustrated in Figs. 1 to 4, inclusive, of the drawings, includes, generally, a sectional body 17 for arrangement in the opening 14 of the master bushing 10, and series of rollers 18 carried by the body 17 to cooperate with the drill stem or kelly K.

The bushing body 17 is shaped to fit the opening 14 of the master bushing 10 and to receive or pass the kelly K. In accordance with the invention the body 17 is polygonal or square in its general configuration having flat substantially vertical sides 19 for cooperating with flat side walls of the opening 14. In accordance with the invention the bushing body 17 has lugs or wings 20 on its corner portions for cooperating with the slots 15 in the master bushing 10. The wings 20 extend vertically of the body 17 and have parallel substantially vertical sides 21 for cooperating with the side walls of the slots 15, and flat downwardly and inwardly inclined outer surfaces 21ª for contacting the inclined slot walls 16. The wings 20 are preferably of substantial length and may extend from adjacent the top of the body 17 to the lower end of the body. The walls of the body 17 and its wings 20 may be hollowed or chambered and reinforcing ribs 22 may extend through their interiors. The upper end of the bushing body 17 is preferably flat and the body 17 is preferably proportioned to project above the upper surface of the master bushing 10 when the kelly bushing is properly seated in the opening 14. A central vertical opening 23 is provided in the bushing body 17 to receive the kelly K. Where the drill stem or kelly K is square in transverse cross section as illustrated, the bushing opening 23 is square and is of uniform size and shape throughout its length. The opening 23 is proportioned to receive the kelly K with suitable slight clearance. The bushing body 17 is preferably sectional to be readily assembled in the opening 14 of the master bushing 10. The body 17 comprises two equal complementary sections A and B. The plane of division or separation of the body 17 substantially bisects two opposite side walls 14 of the opening 23.

The rollers 18 are provided to engage the drill stem or kelly K to transmit the turning forces thereto and are such that the kelly K may shift or move vertically through the bushing body 17 with a minimum of friction. The rollers 18 are provided in the interior of the bushing body 17 being arranged in slots 24 in the walls of the opening 23. The slots 24 are vertical and extend downwardly from the upper end of the body 17 to points a short distance from the lower end of the body 17. Each slot 24 carries a series or plurality of rollers 18 and there may be one or more spaced slots 24 in each wall of the polygonal bushing opening 23. It has been found sufficient and practical to provide one slot 24 in each wall of the polygonal opening 23 adjacent its forward extremity relative to the direction of rotation of the table T whereby the rollers 18 in the slots 24 have the proper driving or turning cooperation with the kelly K. The arrow in Fig. 1 of the drawings indicates the forward or usual direction of rotation of the assembly. The rollers 18 are arranged in stacks or in superimposed relation in the slots 24. In the form of the invention being described the rollers 18 are cylindrical having cylindrical peripheral surfaces for contacting the sides of the square kelly K. The invention provides hardened replaceable shims or liners 25 on the inner walls of the slots 24. The liners 25 may be formed of spring steel and are easily inserted in and removed from the upper ends of the slots 24. The kelly engaging rollers 18 rotatably bear on the liners 25 and their peripheries project from the walls of the opening 23 sufficiently to have the desired contact with the kelly K.

Vertical opposed grooves 9 are provided in the side walls of the grooves of the slots 24 to receive trunnions or axles 26 of the rollers 18. The axles 26 are received in the grooves 9 with substantial clearance to permit the proper working of the rollers 18 and to allow for a reasonable amount of wear. The cooperation of the axles 26 with the walls of the grooves 9 prevents the loss of the rollers 18 from the grooves 24 during the handling of the kelly bushing. Means is provided for preventing the rollers 18 from jumping or working up out of the slots 24. Plates 29 are arranged on the upper end of the bushing body 17 to cover the upper ends of the slots 24. In practice the plates 29 may be secured to the body 17 by screws 30 or the like. The plates 29 may be substantially U-shaped to extend around the adjacent portions of the opening 23 without interfering with the kelly K. The plates 29 extending over the upper ends of the slots 24 prevent the upward displacement of the rollers 18 from the slots. The uppermost rollers 18 may have substantial clearance with the plates 29 to provide for the proper turning and play of the series of rollers. Tapped openings 31 may be provided in the plates 30 to receive lifting rods or lifting tools to facilitate the handling of the body sections A and B.

The invention provides adjustable means for limiting downward movement of the sections A and B of the bushing body 17 in the opening 14. Ears or lugs 32 project from the bushing body 17 above the upper end of the master bushing 10. In practice a lug 32 may project from the outer end or side of each wing 20. Screws 33 are threaded through openings in the lugs 32 and are adapted to contact the upper surface of the master bushing 10 to limit the downward movement of the bushing 17 in the opening 14. Lock nuts 34 may be threaded on the screws 33 to clamp against the lugs 32 and set or hold the screws 33 in adjusted position. The screws 33 may be adjusted and set to engage the bushing 10 and stop the bushing body 17 in a position where the inclined surfaces 21ª of the wings 20 have proper cooperation with the inclined walls 16.

In the operation of the improved kelly bushing described above the sections A and B of the body 17 are arranged in the opening 14 of the master bushing 10 to engage about the kelly K. The outer inclined surfaces 21ª of the wings 20 cooperate with the inclined walls 16 of the slots 15 to urge the bushing sections A and B into proper engagement with the kelly K and assist in aligning the bushing in the table T. The rollers 18 cooperate with the flat vertical surfaces of the kelly K for the transmission of the turning forces to the kelly. The flat walls of the polygonal opening 14 have torque transmitting cooperation with the flat sides 19 of the body 17 and the side walls of the slots 15 have similar engagement with the flat sides 21 of the wings 20. As the surfaces 19 and 21 extend throughout substantially the entire length of the body 17 and may be engaged by the walls of the opening 14 and the slots 15 throughout their entire extents the master bushing 10 has extensive driving engagement with the kelly bushing 17. The screws 33 may be set to engage the upper surfaces of the bushing 10 to position the sections A and B where the inclined surfaces 21ᵃ of the wings 20 have proper engagement with the inclined slot walls 16. The polygonal bushing 17 provided with the external wings 20 fitting the correspondingly shaped opening 14 of the master bushing 10 is positively driven by the master bushing and has such extensive cooperation with the master bushing that it cannot work or wear. The rollers 18 engaging the kelly K positively drive or turn the kelly and being rotatable allow for the free feeding or vertical shifting of the kelly. As the rollers 18 bear on the hard liners 25, the body 17 of the bushing is not subjected to wear in driving the kelly. The plates 29 dependably prevent upward displacement of the rollers 18 and yet permit the proper play and movement of the rollers. The rollers 18 may be easily replaced when worn and the replaceable liners 25 may be replaced from time to time to recondition the kelly bushing.

Fig. 5 of the drawings illustrates another application of the invention. In Fig. 5 of the drawings the body 17 of the kelly bushing described above is shown arranged in the opening 40 of a master bushing 41. The kelly bushing comprising the sectional body 17, the kelly engaging rollers 18, the plates 29, the adjusting screws 33 and the associated parts may be identical with the kelly bushing described above. The opening 40 in the master bushing 41 is of the same shape as the opening 14 and has flat walled slots 42 in its corners for receiving the wings 20 of the body 17. The exterior of the master bushing 41 differs in configuration from the exterior of the master bushing 10. The exterior of the bushing 41 is round or cylindrical and an annular outwardly projecting flange 43 is provided on the bushing 41 at its upper end. The flange 43 fits in a recess 44 in the rotary table R to support the bushing 41 in the table. Circumferentially spaced lugs 45 are provided on the flange 43 and cooperate with bayonet slots 46 in the wall of the recess 44 to provide a drive between the table R and the bushing 41 and to hold the bushing in the table. Plates or blocks 47 are inserted in the bayonet slots 46 ahead of the lugs 45 to lock the lugs in proper cooperation with the bayonet slots. The operation of the assembly shown in Fig. 5 of the drawings is identical with the operation of the previously described embodiment of the invention.

Fig. 6 of the drawings illustrates a form of the invention adapted to receive and drive a worn drill stem or kelly S. The drill stem or kelly S is worn so that its side faces 50 which receive the turning forces are no longer at right angles to the adjacent parts of the adjoining faces. In the form of the invention shown in Fig. 6 of the drawings the slots 24ᵃ provided in the walls of the kelly bushing opening 23 have vertical inner walls 51 angularly disposed with relation to the side walls of the slots and with relation to the walls of the opening 23. Hard replaceable liners 52 may be inserted in the slots 24ᵃ to cover the walls 51. Series of rollers 18ᵃ are provided in the slots 24ᵃ. The rollers 18ᵃ are tapered or frusto-conical to have proper cooperation with the liners 52 and the worn faces 50 of the kelly S. The tapered rollers 18ᵃ project into the opening 23 to transmit the turning forces to the kelly S through their cooperation with the worn faces 50. Axles 54 on the opposite ends of the rollers 18ᵃ cooperate with vertical grooves 9ᵃ in the walls of the slots 24ᵃ to prevent inward displacement of the rollers from the slots. The kelly bushing shown in Fig. 6 of the drawings may be identical with the previously described form of the invention except for the features just described. The engagement of the frusto-conical rollers 18ᵃ with the worn faces 50 of the drill stem or kelly S prevents looseness or excessive play of the kelly S in the opening 23 and accordingly prevents back-lash or slap during operation. The taper or pitch of the surfaces of the rollers 18ᵃ may be properly related to the worn surfaces 50 of the kelly S to provide for the proper engagement between the kelly bushing and the kelly.

Having described only typical preferred forms and applications of my invention I do not wish to be limited or restricted to the specific details herein set forth, but wish to reserve to myself any variations or modifications that may appear to those skilled in the art or fall within the scope of the following claims.

Having described my invention, I claim:

1. In combination, a rotary table bushing having a vertically extending polygonal opening with slots in its corners, and a polygonal drive bushing in the first named bushing having a projecting wing at each corner, said wings cooperating with said slots, the drive bushing having a polygonal opening for receiving a drill stem.

2. A bushing for driving a drill stem comprising, a polygonal body having a polygonal opening for receiving the drill stem, and a wing on each external corner of the body, said wings having inclined outer surfaces.

3. A bushing for driving a drill stem comprising, a polygonal body having an opening for non-rotatably receiving the drill stem, and a projecting wing on each external corner of the body.

4. A bushing for driving a drill stem comprising, a polygonal body having an opening for non-rotatably receiving the drill stem, and a vertically extending wing projecting from each corner of the polygonal body.

5. A drive bushing for a rotary table comprising, a polygonal bushing body having a polygonal opening and slots in the walls of the opening, a projecting wing on each external corner of the body, and series of rollers in the slots for contacting a drill stem extending through the opening.

6. A drive bushing for a rotary table comprising, a bushing body having a polygonal opening, and slots in the walls of the opening, series of tapered rollers in the slots for engaging a drill stem extending through the opening, and means for retaining the rollers in the slots.

7. A drive bushing for a rotary table comprising, a bushing body having a polygonal opening, and a slot in each wall of the opening, the slots in the adjacent walls of the opening being spaced one from the other, series of rollers in the slots for engaging a drill stem extending through the opening, there being longitudinal grooves in the side walls of the slots, and axles on the rollers cooperable with the walls of the grooves to prevent loss of the rollers.

8. A drive bushing of the character described including, a body having a polygonal opening and longitudinal grooves in the walls of the opening, replaceable shims inserted through the upper ends of the grooves to bear on their inner walls, and rollers in the grooves for cooperating with a drill stem and bearing on the shims.

DENNIS L. DRISCOLL.